Jan. 5, 1932.   F. J. ZIMMERSBACH   1,839,781
CHAIN CLAMPING DEVICE
Filed Dec. 19, 1928
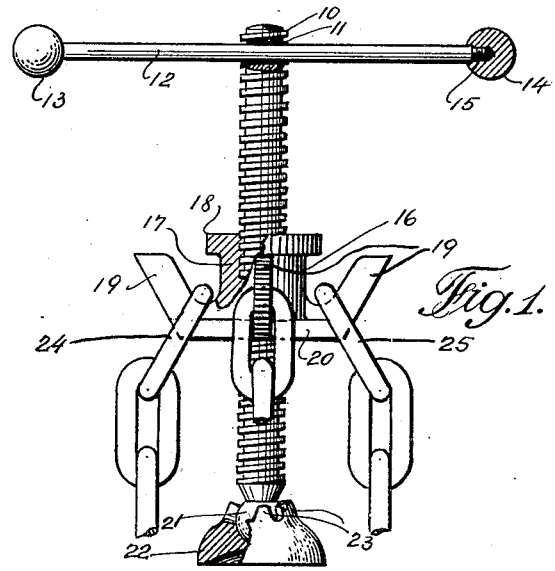
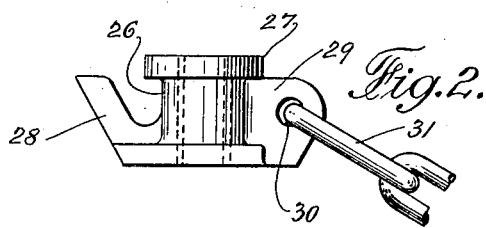
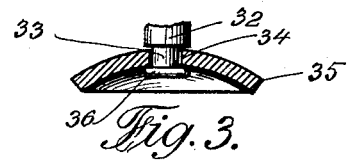
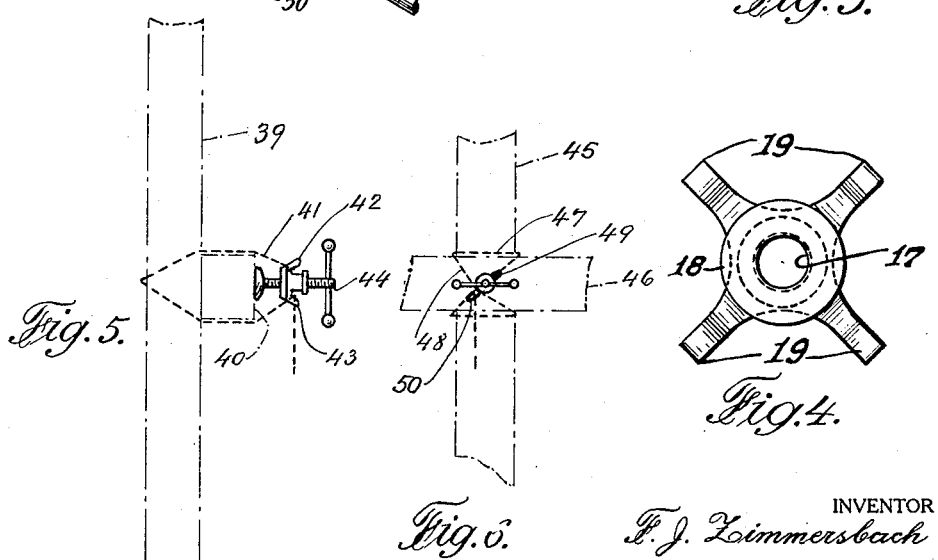
INVENTOR
F. J. Zimmersbach
BY
ATTORNEY Patented Jan. 5, 1932

1,839,781

UNITED STATES PATENT OFFICE

FRANK J. ZIMMERSBACH, OF HEMPSTEAD, NEW YORK

CHAIN CLAMPING DEVICE

Application filed December 19, 1928. Serial No. 326,961.

This invention relates to clamps in general and particularly what may be termed a chain clamp.

The prime object of my invention is to provide a simple, inexpensive, and effective clamping device for either clamping, locking, drawing or tightening together or otherwise engaging one or more objects without the application of tools or without the necessity of joining them by nails, screws or other similar devices.

A further object of my invention is to provide the combination with a chain of a clamping device by means of which such chain, when looped about an object, may be tightened so that the chain will grip such object firmly and prevent its disengagement therefrom.

A still further object of my invention is to provide in combination with a chain, a clamping device which will permit the looping of a chain about one or more objects to be tightened together, and which will facilitate the engagement of the end links of such loop formation in such a manner that the pulls exerted by the clamping device against the two chain end will have a resultant pull disposed substantially in the longitudinal center axis of the clamping device.

Another object of my invention is to provide in connection with such clamping device, means for resting the device against an object, and at the same time permitting the clamping device to assume a central position between the pulls exerted by the device upon the chain ends.

The foregoing and further objects will be more fully apparent from the following description and the accompanying drawings, forming part of this disclosure, but by no means intended to limit it to the actual showing, and in which Figure 1 is an elevation of my device, partially in section, showing its arrangement in connection with the ends of a pair of looped chains.

Figure 2 illustrates a modified form of a chain engaging member,

Figure 3 illustrates a cross sectional view through a modified form of a rest or bearing plate of my device, Figure 4 illustrates a top view of the chain engaging member, Figure 5 illustrates a diagrammatical view of my device engaging two crosswise arranged beams, and Figure 6 illustrates a modified attachment of my device engaging two crossing beams.

Referring to the figures, numeral 10 denotes a threaded spindle at the upper end of which is provided an aperture 11, through which is passed an operating handle 12. The left end of the handle is equipped with a stationary enlargement 13, while the right hand end is equipped with a removable enlargement 14, preferably threaded to the reduced end 15 of bar 12.

Associated wth spindle 10 there will be seen a chain-engaging member 16, which consists of a nut or sleeve portion 17 provided with a reinforcement 18 and hook members 19 extending sidewise from the nut portion 17. At the bottom of the chain-engaging member there will be observed a reinforcement, indicated at 20, which is adapted to strengthen the connection between hooks 19 and nut member 17. Attention is directed to Figure 4 wherein there is disclosed a detailed construction of the chain engaging member. It will be observed that the nut or sleeve which is threaded on the spindle is formed with angularly disposed pairs of arms that extend radially from the lower edge portion of the sleeve, the outer ends of the several arms being bent laterally and upwardly to form hooks. In the present instance, there is disclosed two pairs of such hooks, each pair of hooks being adapted to receive the end links of a chain and when the device is used in conjunction with a pair of beams or pipes disposed in angular relation with respect to each other, the two chains will extend around the intersecting members and will have their free ends engaged with the respective hooks whereby to rigidly support the angularly disposed beams or pipes in assembled relation.

At the lower end of the spindle there is provided a bearing ball 21, which is held in a rest or bearing member or plate 22, by means of its prongs 23, which are bent over the upper end of ball 21 after the latter has been inserted into the socket provided in the rest.

In Figure 2 a modified form of the chain engaging member is illustrated, where again a nut portion 26 is shown provided with an upper reinforcement 27. From the nut portion 26 projects to the left side a hook extension 28, while at the right side a perforated extension 29 is illustrated. Through the aperture 30 of extension 29, there will be seen a chain link 31, which is permanently associated with extension 29.

Referring to Figure 3, a modified form of the lower spindle portion 32 is illustrated. In this figure spindle 32 is reduced at 33, and projects through the aperture 34 of bearing plate 35, and is held against disengagement therefrom by means of a broadened end 36. From both Figure 1 and Figure 3 it will be clearly understood that the joint between plates 22 and 35 and the spindles 10 and 32, respectively, are both swivel joints to permit the self-adjustment of the spindle relative to the pull exerted by the chain-engaging member upon the chain ends.

Operation

The application and operation of my device will be clearly understood when considered in connection with the illustrations shown in Figures 5 and 6.

Referring to Figure 5, there will be seen a vertical beam 39, indicated in broken lines, against which is held a cross beam 40. A chain, indicated at 41, is passed about beams 39 and 40, and one of the chain links engages the upper hook 42, while the link ending the loop engages hook 43. By turning spindle 44, resting against beam 40, the chain-engaging member is drawn outwards, and thereby tightens chain 41 about the two beams.

In Figure 6 a similar arrangement is shown, where again a vertical beam 45 is observed being crossed by another beam 46. In this case, however, the chain 47 is looped about the beams in a different manner and crosses, as indicated, at 48. In this case the upper hook 49 engages one end link while the lower hook 50 engages the link which forms the end of the cross loop formed by the chain about beams 45 and 46.

By operating the spindle of my device, the tightening of the chain about the beams is accomplished, thereby the two beams are held firmly together. Just as quickly as my device may connect two or more objects and firmly hold them in a secure grip, the device may be readily detached, and the connection between the two objects severed.

In Figures 5 and 6, I have illustrated one possible application of my device which becomes particularly advantageous in erecting scaffolding. My device makes it possible to erect scaffolding noiselessly and without the application of any tools whatsoever.

The foregoing is only one of the possible uses in which my device may be employed. Needless to say that its application is practically unlimited and is therefore not confined to the showing and the aforesaid description. It may be used by the machinist, the mechanic, the automobile repair man, the carpenter and any other artisan. It can be used as a pipe vise; it may be employed in gluing together of articles; it may be used for temporary repairs of various articles, and a great many other applications. Similarly, its construction may be changed to facilitate its use for particular work, and I therefore reserve for myself the right to make changes or improvements as may become necessary, without departing from the broad idea of the combination between a chain and clamping device, in which the various pulls exerted by the clamping device upon the chain ends combine in a resultant, disposed substantially in the center axis of the spindle of my clamping device.

I claim:

A clamping structure adapted to clamp a pair of intersecting members by means of a pair of chains, comprising a threaded spindle, a head carried by the inner end of the spindle for engagement with one of the aforesaid members, an actuating handle carried by the outer end of the spindle, a sleeve threaded on the spindle, an enlarged reinforcement formed on the inner end of the sleeve, two pairs of right angularly disposed arms extending radially from said reinforcement, the outer end of each arm being disposed laterally and directed toward the handle end of the spindle in an oblique manner to form chain-engaging hooks, one pair of hooks being adapted to engage the free end portions of one chain, the other pair of hooks being adapted to engage the free end portions of the other chain, the inner ends of the hooks being joined to the adjacent portion of the sleeve.

In testimony whereof I affix my signature.

FRANK J. ZIMMERSBACH.